(12) United States Patent
Valiani et al.

(10) Patent No.: US 9,866,145 B2
(45) Date of Patent: Jan. 9, 2018

(54) CONTROL OF LEAKAGE CURRENTS IN SYSTEMS WITH A PLURALITY OF PARALLEL INVERTERS

(75) Inventors: Massimo Valiani, Corciano (IT); David Martini, Valdarno (IT); Andrea Marcianesi, Arezzo (IT)

(73) Assignee: ABB Technology AG, Zurich (CH)

( * ) Notice: Subject to any disclaimer, the term of this patent is extended or adjusted under 35 U.S.C. 154(b) by 782 days.

(21) Appl. No.: 14/238,170

(22) PCT Filed: Aug. 12, 2011

(86) PCT No.: PCT/IT2011/000297
§ 371 (c)(1),
(2), (4) Date: Feb. 19, 2015

(87) PCT Pub. No.: WO2013/024496
PCT Pub. Date: Feb. 21, 2013

(65) Prior Publication Data
US 2015/0171766 A1 Jun. 18, 2015

(51) Int. Cl.
*H02M 7/493* (2007.01)
*H02J 3/38* (2006.01)
*H02M 7/487* (2007.01)

(52) U.S. Cl.
CPC ............ *H02M 7/493* (2013.01); *H02J 3/383* (2013.01); *H02J 3/385* (2013.01); *H02M 7/487* (2013.01); *Y02E 10/563* (2013.01); *Y10T 307/707* (2015.04)

(58) Field of Classification Search
None
See application file for complete search history.

(56) References Cited

U.S. PATENT DOCUMENTS

2005/0151658 A1* 7/2005 Kono .................... B60L 3/0023
340/647

FOREIGN PATENT DOCUMENTS

| EP | 1555536 | 7/2005 |
| JP | 2002199738 | 7/2002 |

OTHER PUBLICATIONS

European Patent Office: International Preliminary Report on Patentability, dated Nov. 6, 2013.

* cited by examiner

*Primary Examiner* — Rexford Barnie
*Assistant Examiner* — Swarna N Chowdhuri
(74) *Attorney, Agent, or Firm* — Patterson Intellectual Property Law, P.C.; Mark J. Patterson; Gary L. Montle

(57) ABSTRACT

There is described an electrical energy conversion system comprising: at least a first inverter (1) and at least a second inverter (2), whose outputs are connected in parallel; at least a first DC voltage source (PV1) connected to the input of the first inverter (1) and a second DC voltage source (PV2) connected to the input of the second inverter (2); a ground connection of the first inverter (1) and a ground connection of the second inverter (2). The ground connection of said inverters comprises a ground connection branch (1G; 2G) with a current sensor (5/1; 5/2) which supplies a signal proportional to a leakage grounding current ($I_{leak}$) measured in said ground connection branch (1G; 2G). Through the signal proportional to the leakage current measured a feedback signal is generated to control the leakage current ($I_{leak}$).

23 Claims, 4 Drawing Sheets

(STATE OF THE ART)

(STATE OF THE ART)

CONTROL OF LEAKAGE CURRENTS IN SYSTEMS WITH A PLURALITY OF PARALLEL INVERTERS

TECHNICAL FIELD

The present invention relates in general to electric energy conversion, and in particular to inverters for the conversion of a DC voltage electrical current into an AC voltage electrical current. The invention especially relates to systems comprising a plurality of inverters based on PWM (pulse-width-modulation) connected in parallel to a load and/or to an electrical distribution network.

BACKGROUND ART

PWM (pulse-width-modulation) electric energy conversion devices are electrical devices adapted to transfer electrical energy from an input source, generally a DC voltage source, to an output, generally with AC voltage. Inverters of this type are for example used to convert DC voltage electrical energy supplied by a renewable energy source into AC electrical energy to be fed into a distribution grid, for example a 50 Hz or 60 Hz grid. In other applications, the inverter can be used to supply a load, for example an electric motor, at AC voltage.

In general, inverters used to convert energy coming from a renewable source, such as a photovoltaic panel or the like, can supply AC voltage electrical energy to be fed alternately into a distribution grid or to supply a local load, according to need and as a function of the quantity of electrical energy available from the DC source.

The electrical energy source can for example be a photovoltaic panel or a field of photovoltaic panels, a wind turbine generator or a group of wind turbine generators, or even a source with fuel cells or the like.

In many applications it is necessary to ground the DC voltage energy source. For example, in the case of photovoltaic panels, the positive or negative terminal of the panel or of the series of photovoltaic panels, is usually grounded to prevent degradation of the panel caused by the accumulation of charges on stray capacitance to ground. In other situations, for example in the case of supplying power to electric motors, the motor casing is grounded to prevent phenomena of erosion caused by leakage currents.

Grounding of a single machine or of a single inverter is normally a simple operation, but some problems may occur in the case of a plurality of devices which share the same AC voltage output. In this case each inverter has a ground connection and the outputs are connected in parallel with one another.

If, for example, the inverters are connected to a distribution grid, the neutral of which has a different potential to the potential of the ground connection point of the inverters, strong leakage currents are generated, which flow through the electronic switches of the inverters with the risk of destroying them.

Inverters are normally connected in parallel on a LV/MV (Low Voltage/Medium Voltage) transformer. To avoid the recirculation of high ground currents on several inverters, it is necessary to use multiple windings output transformers on the low voltage side, so as to obtain galvanic isolation between the inverters and therefore avoid the recirculation of high intensity currents through the ground connection. A configuration of this type is very onerous.

The problem of leakage currents in the case of a system with several electrical energy sources connected to a plurality of inverters connected in parallel to one another to an electrical distribution grid will be better illustrated with reference to FIGS. 1 and 2. However, it must be understood that similar problems can occur not only in the case of connection to the distribution grid, but also, for example, when two or more parallel inverters supply a common load.

FIGS. 1 and 2 refer in particular to a system, in which two photovoltaic inverters are each connected to a respective photovoltaic panel or to a field of photovoltaic panels, while the outputs of the two inverters are connected in parallel to a three-phase electrical distribution grid. PV1 and PV2 indicate the two fields of photovoltaic panels connected respectively to a first inverter 1 and to a second inverter 2. In the example illustrated, each inverter 1, 2 is a two-stage inverter and comprises a DC/DC stage and a DC/AC stage. The three-phase outputs of the two inverters 1, 2 are connected in parallel to a three-phase grid GR, the neutral of which is indicated with N.

On the input side each inverter has a plurality of bulk capacitors in series. In the case illustrated, four bulk capacitors are provided, indicated with C1/1, C2/1, C3/1 and C4/1 for the inverter 1 and with C1/2, C2/2, C3/2 and C4/2 for the inverter 2. The DC voltage electrical energy source is connected across the series arrangement of the two central capacitors. More precisely, the positive pole of the source PV1 is connected between the capacitor C1/1 and the capacitor C2/1, while the negative pole of the source PV1 is connected between the capacitor C3/1 and the capacitor C4/1. Moreover, the positive pole of the source PV2 is connected between the capacitor C1/2 and the capacitor C2/2, while the negative pole of the source PV2 is connected between the capacitor C3/2 and the capacitor C4/2. T1 and T2 indicate the central points of the series of bulk capacitors of the two inverters 1 and 2. Each inverter is therefore an inverter with four voltage levels. Each DC/DC stage charges the capacitors C1/1 and C4/1 of the inverter 1 and the capacitors C1/2 and C4/2 of the inverter 2. For the inverter 1 the capacitor C1/1 and the capacitor C4/1 are charged using energy drawn from the capacitor C2/1 and C3/1, respectively. Likewise, for the inverter 2 the capacitor C1/2 and the capacitor C4/2 are charged using energy drawn from the capacitor C2/2 and C3/2, respectively.

It shall be noted that, in general PV1 and PV2 can be different sections of a same field of photovoltaic panels, or different fields of photovoltaic panels also separated spatially. The dimension of the two fields of photovoltaic panels and/or the conditions of solar irradiation or other parameters can be different for the sources PV2 and PV2, so that the voltages $V_1$ and $V_2$ at the output of the two electrical energy sources will in general differ from one another.

For the aforesaid reasons, each inverter is grounded. In the example illustrated the ground connection is made in the point E1 for the source PV1 and the related inverter 1 and in the point E2 for the source PV2 and the related inverter 2. In the example illustrated, the ground connection points are on the negative terminal, but this is only an example, it being understood that the ground connection could also be made on the positive terminal. The considerations set forth below are also valid in this second case.

As the two voltages $V_1$ and $V_2$ are generally not identical, the voltages $V_{C3/1}$ and $V_{C3/2}$ across the capacitor C3/1 for the inverter 1 and across the capacitor C3/2 for the inverter 2 will normally also be different and equivalent to $\frac{1}{2}(V_1)$ and $\frac{1}{2}(V_2)$ respectively. Due to the ground connection, if the aforesaid two voltages are different, in the absence of appropriate measures there will be a leakage grounding current, as can be understood from the equivalent circuit represented in FIG. 2. $I_{leak}$ indicates the leakage current. As a result of the connection in parallel of the AC output of the two inverters, then the voltage between the neutral N of the three-phase networks Gr and the central point T1 (isolated ground point) of the series of bulk capacitors of the inverter 1 is equal to the voltage between the neutral N and the central point T2 (ground) of the series of bulk capacitors of the inverter 2. In other words, the following relation is valid:

$$\overline{V_{NT_1}} = \overline{V_{NT_2}} \quad (1)$$

This condition, which is represented here for a system with two inverters, is valid for all the inverters connected to the same network transformer, for example a same LV/MV transformer.

The current which can flow through the ground connection is virtually unlimited, i.e. limited only by the stray resistance and can cause damage to the inverters as well as constituting a serious risk for the correct operation of the system.

As mentioned above, to avoid the occurrence of a leakage current to ground $I_{leak}$ in the state of the art a LV/MV transformer is normally used, provided with a plurality of low voltage windings galvanically isolated from one another, each of which is connected to one of the inverters of the system. This implies very high costs.

BRIEF DESCRIPTION OF THE INVENTION

According to one aspect, the invention proposes a system to avoid or at least partly reduce the aforesaid drawbacks of the prior art. According to another aspect, the invention proposes a method for reducing, at least in part, the drawbacks of prior art methods for controlling or suppressing the leakage grounding current in systems with a plurality of inverters connected in parallel.

In substance, the invention is based on the use of an active control of the leakage current in inverters with ground connection. The invention provides, for each inverter, for a particular ground connection branch to be connected between the grounding point of the system and the DC energy source point, for example a photovoltaic panel, to be grounded.

A current detector is placed on the ground connection branch and the feedback signal generated by this detector is used to control the leakage current between the inverters connected to the system. As will be clear from the description below, with this method it is not necessary for the inverters to be connected to one another, or for them to share data.

According to some embodiments, the invention provides for an electrical energy conversion system comprising: at least a first inverter and at least a second inverter, whose outputs are connected in parallel; at least a first DC voltage source connected to the input of the first inverter and a second DC voltage source connected to the input of the second inverter; a ground connection of the first inverter and a ground connection of the second inverter. The ground connection of at least one of said first inverter and second inverter comprises a ground connection branch with a current sensor which supplies a signal proportional to a leakage grounding current measured in said ground connection branch. From the signal supplied by the current sensor, a feedback signal is generated to control the leakage current. The feedback signal is, for example, obtained with a comparator (in which the leakage current detected and the desired leakage current are compared generating an error) and a regulating block. The feedback signal can be applied to a control loop of the voltage across a bulk capacitor of the respective inverter.

In advantageous embodiments, at least one of said inverters comprises a control loop which, on the basis of the signal proportional to the leakage current measured and of a desired leakage current reference, imparts a voltage variation across a bulk capacitor of said at least one inverter. The voltage variation imparted is such as to reduce the difference between the leakage current measured and the desired leakage current reference, for example placed equal to zero.

According to a possible embodiment, therefore, the invention provides for an electrical energy conversion system comprising: at least a first inverter and at least a second inverter, whose outputs are connected in parallel; at least a first DC voltage source connected to the input of the first inverter and a second DC voltage source connected to the input of the second inverter; a ground connection of the first inverter and a ground connection of the second inverter. The ground connection of at least one of said first inverter and second inverter comprises a ground connection branch with a current sensor which supplies a signal proportional to a leakage grounding current measured in said ground connection branch. Moreover, at least one control loop is provided, which on the basis of said signal proportional to the leakage current measured and of a desired leakage current reference, imparts a voltage variation across a bulk capacitor of said at least one inverter, said voltage variation being adapted to reduce the difference between the leakage current measured and the desired leakage current reference.

In particularly advantageous embodiments of the invention, each of the inverters of the system has a ground connection branch comprising a respective current sensor to supply a signal proportional to the leakage grounding current measured by said current sensor. Moreover, each inverter comprises a control loop which, on the basis of the signal proportional to the leakage current measured and of the desired leakage current reference, imparts a voltage variation across a bulk capacitor of the respective inverter. The voltage variation imparted is such as to reduce the difference between the leakage current measured and the desired leakage current reference.

In some embodiments of the invention, the system can comprise a generic number N of inverters. All the inverters less one can be provided with a leakage current detector and with a leakage current control loop.

In some embodiments, each inverter comprises at least two bulk capacitors in series, between which an isolated central ground point is defined.

According to another aspect, the invention relates to a method for controlling the leakage grounding current in a system comprising: at least a first inverter and at least a second inverter, whose outputs are connected in parallel; at least a first DC voltage source connected to the input of the first inverter ad a second DC voltage source connected to the input of the second inverter; a ground connection of the first inverter and a ground connection of the second inverter. The method provides for detecting a leakage grounding current in the ground connection of at least one of said inverters, and for generating a feedback signal to control said leakage current. When the system comprises a plurality of inverters, in general detection of the leakage current is carried out on all the inverters or at least on all the inverters less one. A control loop of the leakage current on all the inverters or on all the inverters less one allows the leakage current to be controlled and taken to a desired value, typically zero.

For this purpose, some embodiments provide for modification of the voltage across at least one bulk capacitor at the input of each inverter provided with a current control loop. The voltage across the bulk capacitor is controlled to impart to the leakage current measured a variation toward a desired leakage current value, for example equal to zero.

Further advantageous features and embodiments of the method and of the system according to the invention are indicated in the appended claims, which form an integral part of the present specification, and in the detailed description below.

The method of controlling the leakage current offers the advantage of connecting a plurality of different photovoltaic fields or other sources, for example characterized by different MPP (Maximum Power Point) voltages, at the same ground potential without compromising the possibility of connecting the respective inverters to the same Ac grid, avoiding the use of complex and costly measures, such as the use of galvanically isolated windings on the LV/MV transformer.

The reduction of the leakage current implies important advantages in terms of reduction of electrical noise and stress.

Using a ground connection branch which is capable of detecting the leakage current and optionally a protection fuse, it is possible to substitute existing ground connection branches with ground connection branches according to the invention.

BRIEF DESCRIPTION OF THE DRAWINGS

The invention will now be better understood following the description and the accompanying drawings, which show a non-limiting embodiment of the invention. More in particular, in the drawings.

DESCRIPTION OF EMBODIMENTS OF THE INVENTION

There will be described below an embodiment of the invention applied to a photovoltaic system with two sections or groups of photovoltaic panels associated with two inverters, which are in turn connected at the output to a three-phase electrical distribution grid. However, as indicated in the introductory part of the description, the invention can also be applied to systems of other type, each time the outputs of two or more inverters are connected in parallel and the inverters have respective ground connections.

Figure 1:
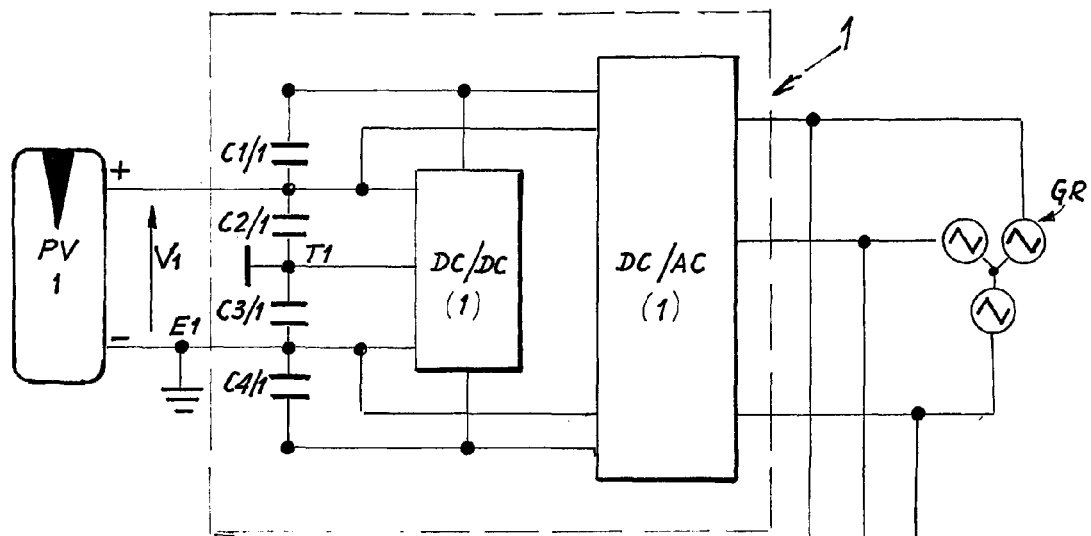
FIGS. 1 and 2 show a system according to the state of the art.
Figure 1:
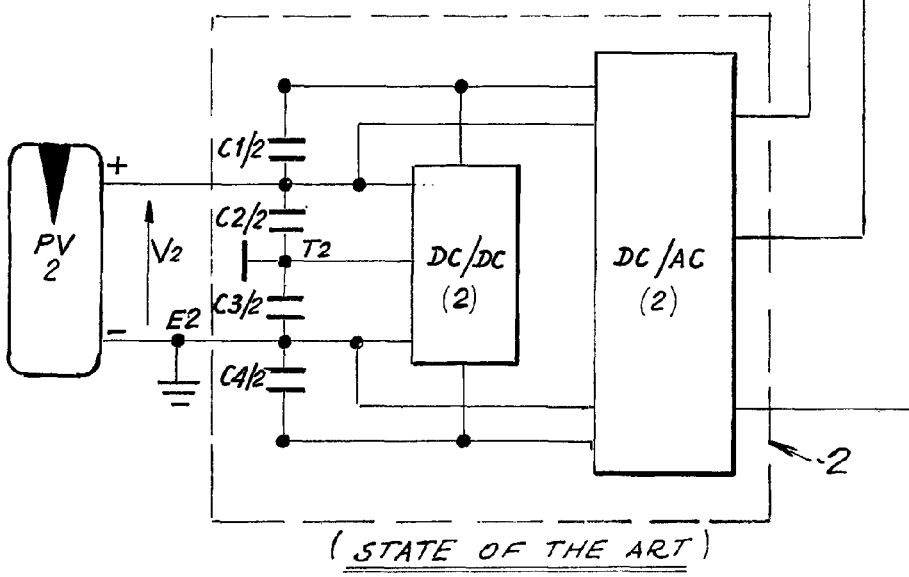
Figure 2:
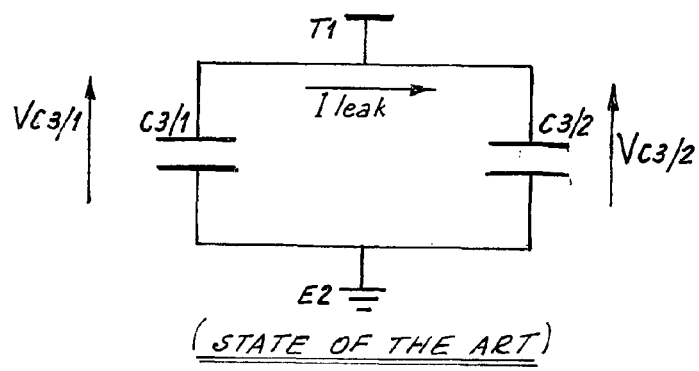

Similarly to what is illustrated with reference to FIG. 1, in FIG. 3 PV1 and PV2 indicate two fields of photovoltaic panels respectively connected to a first inverter 1 and to a second inverter 2. Each field of photovoltaic panels.

In the example illustrated, each inverter 1, 2 is a two-stage inverter and comprises a DC/DC stage and a DC/AC stage. For the inverter 1 the DC/DC stage is indicated with 1A and the DC/AC stage is indicated with 1B. For the inverter 2 the DC/DC stage is indicated with 2A and the DC/AC stage is indicated with 2B. The three-phase outputs of the two inverters 1, 2 are connected in parallel to a three-phase electrical energy distribution grid, indicated as a whole and schematically with GR. N indicates the neutral of the grid GR. In some embodiments, the two inverters can be connected to the grid at a LV/MV transformer, which for each phase can have a single primary winding and a single secondary winding, as (contrary to systems known in the state of the art), galvanic isolation is not required between the outputs of the various inverters in parallel, for the reasons described below.

On the input side each inverter has a plurality of bulk capacitors arranged in series. In the example illustrated in FIG. 3, four bulk capacitors are provided, indicated with C1/1, C2/1, C3/1 and C4/1 for the inverter 1 and with C1/2, C2/2, C3/2 and C4/2 for the inverter 2. The DC source constituted by the field of photovoltaic panels PV1 is connected with the positive pole between the capacitor C1/1 and the capacitor C2/1 of the inverter 1 and with the negative pole between the capacitor C3/1 and the capacitor C4/1 of the inverter 1. The DC source constituted by the field of photovoltaic panels PV2 is connected with the positive pole between the capacitor C1/2 and the capacitor C2/2 of the inverter 2 and with the negative pole between the capacitor C3/2 and the capacitor C4/2 of the inverter 2. T1 and T2 indicate the central isolated ground points, placed between the two intermediate capacitors C2/1, C3/1 and C2/2, C3/2 of the series of the bulk capacitors of the two inverters 1 and 2. The relation defined by the equation (1) exists between the voltages in the points T1, T2 and N.

In the example illustrated, the inverters 1 and 2 are inverters with four voltage levels. The DC/DC stage of each inverter charges the capacitors C1/1 and C4/1 of the inverter 1 and the capacitors C1/2 and C4/2 of the inverter 2. For the inverter 1 the capacitor C1/1 and the capacitor C4/1 are charged using energy drawn from the capacitor C2/1 and C3/1, respectively. Likewise, for the inverter 2 the capacitor C1/2 and the capacitor C4/2 are charged using energy drawn from the capacitor C2/2 and C3/2, respectively.

Figure 3:
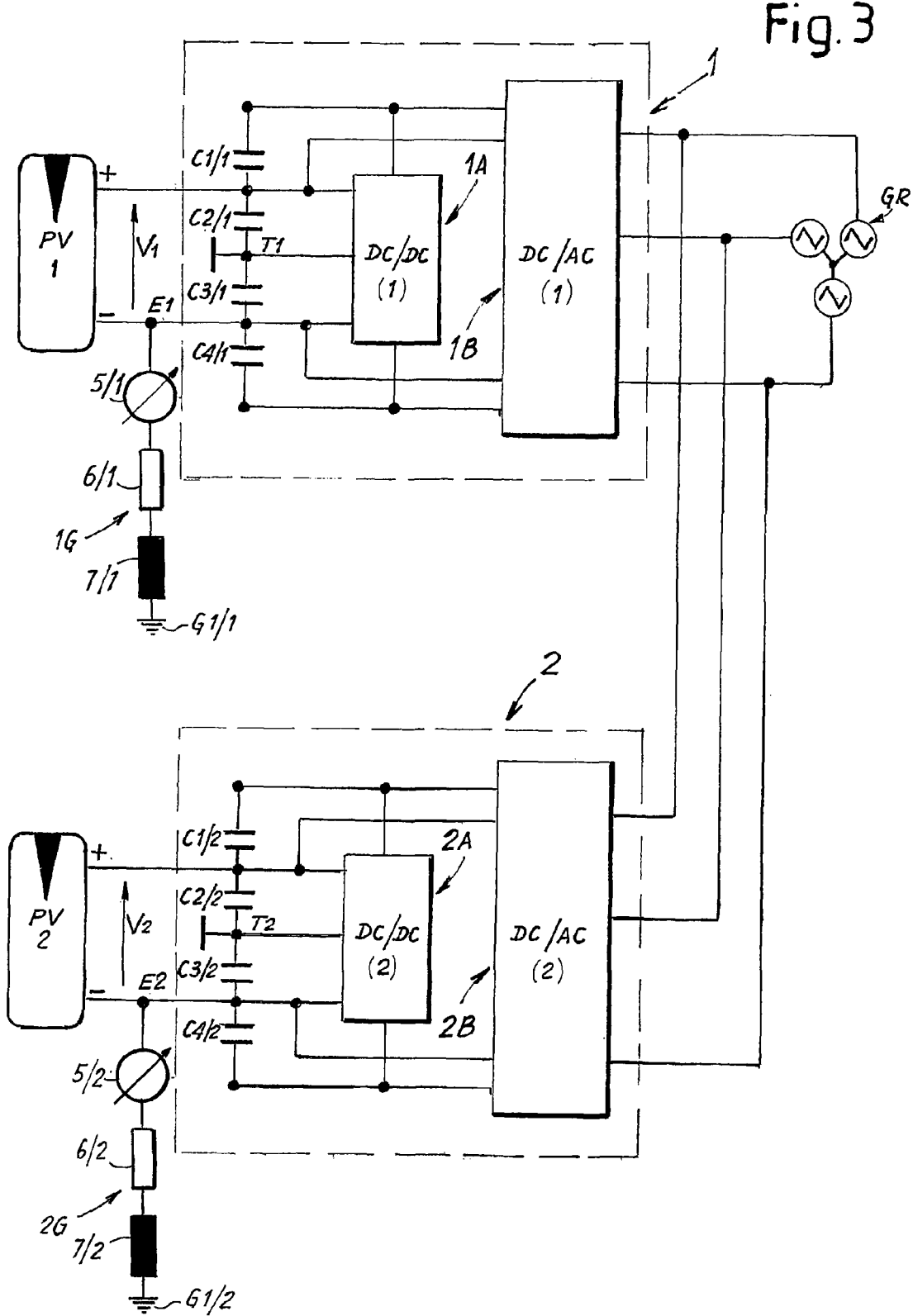
FIG. 3 shows a system with two photovoltaic inverters connected in parallel to an electrical distribution network and with a ground connection according to the invention.

In the diagram of FIG. 3, $V_1$ and $V_2$ indicate the voltages across the respective DC source and therefore at the input of the DC/DC stage of the respective inverter 1 and 2. The two sources PV1 and PV2 can differ from one another in size and/or position (and therefore the degree of solar irradiation will differ). Consequently, the voltage $V_1$ will generally differ from the voltage $V_2$.

In the example shown, a ground connection is provided on the negative pole for each photovoltaic field PV1, PV2. In other embodiments the ground connection can be on the positive pole. The considerations below apply in the same way. In any case, it is necessary for the ground connections, of the photovoltaic fields PV1 and PV2 to be uniform, in the sense that if ground connections exist, these must both be on the positive pole or both be on the negative pole for both fields. The same condition must be produced in the case of a plurality of photovoltaic fields connected to the same LV/MV winding of the electrical grid through electrical machines, as illustrated in FIG. 3.

Figure 4:
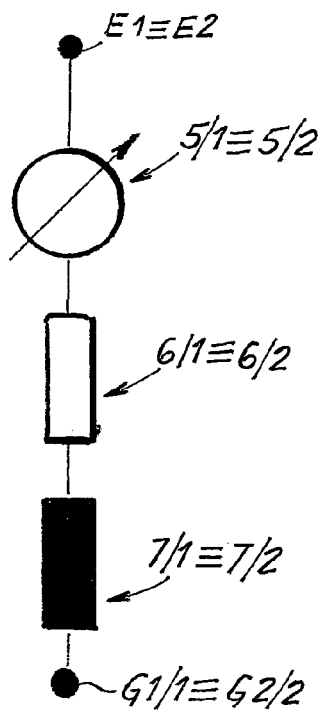
FIG. 4 shows a diagram of a ground connection of the system of FIG. 3.

E1 and E2 indicate the connection points to a respective ground connection branch of the two photovoltaic panels PV1 and PV2. In the embodiment shown the two ground connection branches are configured in the same way, but this is not essential, as will be clear from the description below. In the diagram of FIG. 3, the ground connection branches are indicated with 1G and 2G for the inverter 1 and for the inverter 2, respectively. FIG. 4 shows an enlargement of each ground connection branch 1G, 2G.

In the branch 1G, between the connection point E1 to the output of the source PV1 and the ground G1/1 there are arranged in series: a current sensor 5/1, a protection fuse 6/1 and a resistor 7/1. In the branch 2G between the connection point E1 to the output of the source PV1 and the ground G1/2 there are arranged in series: a current sensor 5/2, a protection fuse 6/2 and a resistor 7/2.

Figure 5:
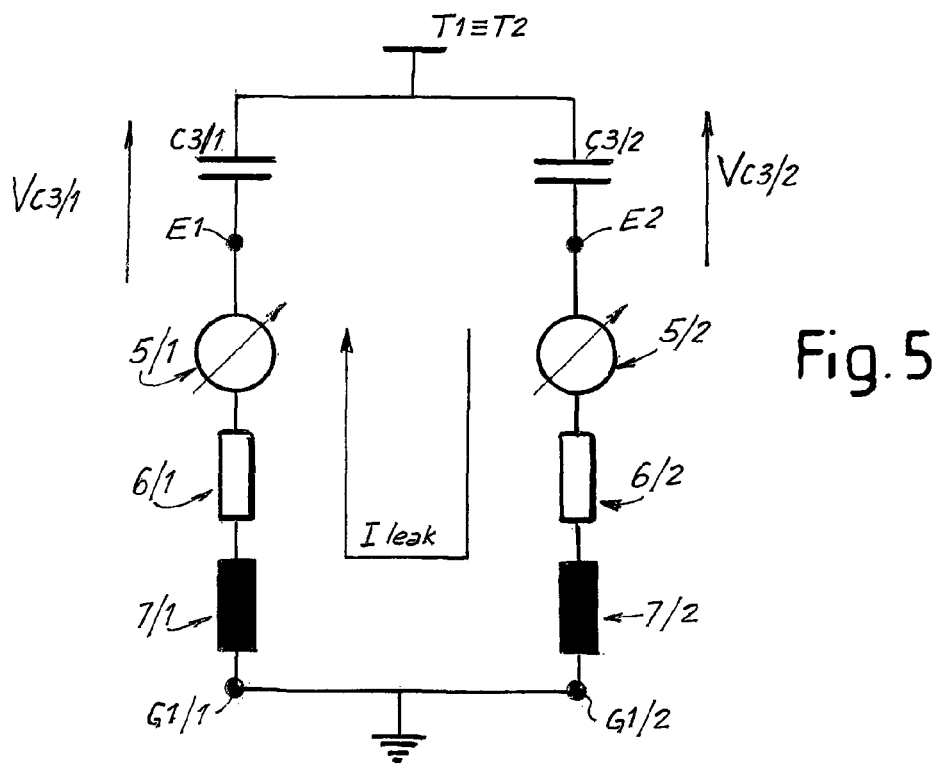
FIG. 5 shows an equivalent electrical circuit of the ground connection of the system of FIG. 4.

FIG. 5 shows the equivalent circuit. The same numbers indicate parts that are the same as or equivalent to those of the diagram of FIG. 4. $V_{C3/1}$ and $V_{C3/2}$ indicate the voltages across the capacitors C3/1 and C3/2 respectively. As is clear from the equivalent circuit of FIG. 5, the leakage current $I_{leak}$ between the two inverters 1 and 2 is given by:

$$I_{leak} = \frac{V_{C3/1} - V_{C3/2}}{2R} \qquad (2)$$

where R is the value of each resistor 7/1 and 7/2 which, in this embodiment, are the same as each other.

Figure 6:
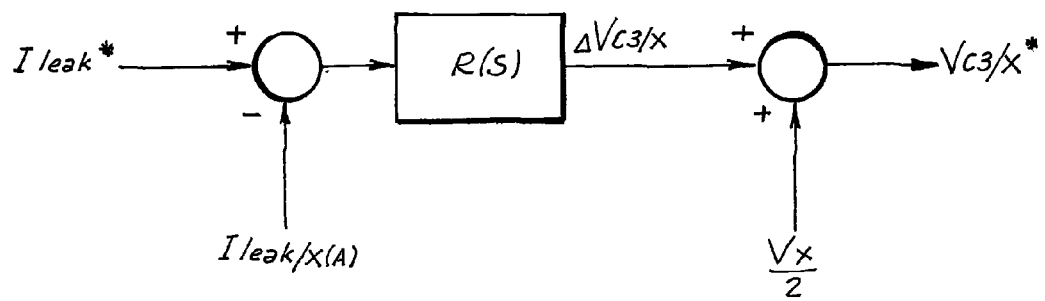
FIG. 6 shows a block diagram of the leakage current control loop.

If the DC/DC stage of each inverter is designed in such a manner as to control the voltage across the capacitors C2/1 and C2/2, it is possible to control the numerator of the fraction of the equation (2). On the basis of this assumption, FIG. 6 shows the diagram of a control loop of the leakage current $I_{leak}$ of a single inverter. The diagram is generic and is valid for both the inverters 1 and 2. The reference "x" can be "1" or "2" respectively, according to which of the two inverters 1, 2 is considered. Therefore, in the diagram of FIG. 6:

$I_{leak}$* indicates the value of the leakage current to be imparted and which will normally be equal to 0. However, the method of controlling the leakage current is general and could also be used to impart a leakage current different than zero;

$I_{leak}/x(A)$ indicates the leakage current measured by the current sensor 5/1 or 5/2 (as x=1 for the ground connection branch 1G of the inverter 1 and x=2 for the ground connection branch of the inverter 2);

R(s) indicates the regulating block characterized by a suitable transfer function;

$\Delta V_{c3/x}$ indicates the voltage difference to be added across the capacitor C3/1 (x=1, inverter 1) or C3/2 (x=2, inverter 2) to correct the error between the leakage current measured $I_{leak}/x(A)$ and the desired leakage current $I_{leak}$* (usually equal to zero);

$V_x$ indicates the output voltage of the field of photovoltaic panels and therefore is equal to $V_1$ (x=1) for the inverter 1 and $V_2$ (x=2) for the inverter 2;

$V_{c3/x}$* indicates the correct voltage $V_{c3/1}$ across the capacitor C3/1 for the inverter 1 (x=1) and $V_{c3/2}$ across the capacitor C3/2 for the inverter 2 (x=2).

The action of the control loop is the following. The measured leakage current $I_{leak}/x(A)$ is compared with the desired value $I_{leak}$* (equal to zero in the example). The error between the two values is processed by a regulating block R(s). The result of the processing operation is a voltage value which must be added to the voltage across the capacitor C3/1 or C3/2, which is equal to half the voltage $V_x$ (x=1, 2) of the source PV1 or PV2. In this manner the reference voltage $V_{c3/x}$* (x=1, 2) is obtained, which must be imparted across the capacitor C3/x of the respective inverter to eliminate the leakage current. This voltage can be obtained by the voltage control of the DC/DC stage of the respective inverter. Preferably, this negative reaction is applied to each inverter 1, 2 connected in parallel on the grid GR. With reference to the equivalent circuit of FIG. 5, the measured leakage current $I_{leak}/x(A)$ will be detected as positive for the inverter 1 and as negative for the inverter 2. The regulating action will be of opposite sign in the two inverters. Consequently, the overloaded capacitor will be discharged and the underloaded capacitor will be charged.

As will be clear later on, the control system thus configured is stable and rapidly converging toward a condition of leakage current $I_{leak}$ equal to the desired value $I_{leak}$*.

The condition to obtain a stable system is that the bandwidth of the control loop of the DC/DC stage is much greater than the closed loop bandwidth of the leakage current control loop. This condition is normally fulfilled in the practical cases.

Figure 7:
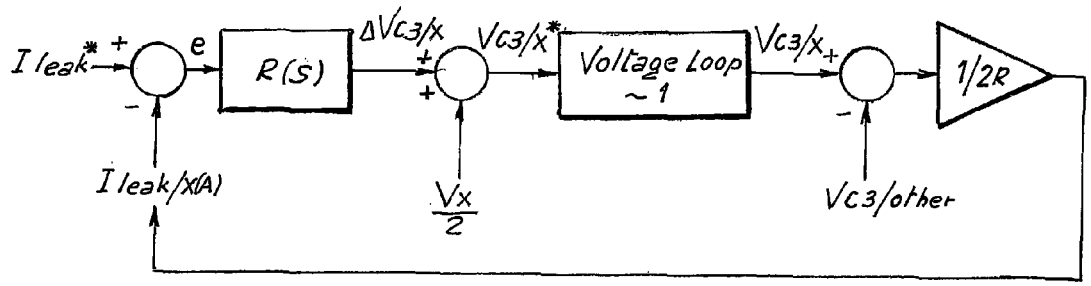
FIG. 7 shows a model of the closed control loop.

Starting from this assumption, the control algorithm schematized in FIG. 6 will be used in combination with the equation (2) to define an equivalent model represented in FIG. 7 in the case of a system with two inverters as represented schematically in FIG. 3. In FIG. 7 the same symbols indicate the same quantities and the same parameters already defined with reference to FIG. 6. Thus x=1 for the inverter 1 and x=2 for the inverter 2. The voltage $V_{c3/x}$* obtained by adding the voltage ½($V_x$) across the capacitor C3/x to the correction value obtained by the leakage current control loop is supplied at the input of the voltage control loop of the inverter and more precisely of the DC/DC stage of the inverter.

As can be seen from the diagram of FIG. 5 and from the equation (2), the voltages of both the capacitors C3/x appear in the equivalent circuit. Consequently, in the control loop of FIG. 7 related to one inverter, as well as the voltage ½$V_x$ across the capacitor C3/x of the inverter considered, the voltage, indicated with $V_{c3/other}$, across the corresponding capacitor C3 of the other inverter (or of the plurality of inverters connected to the same LV/MV winding of the output network) is also present. In the case of the inverter 1, for example, in the diagram of FIG. 7 we will have x=1 and the voltage $V_{c3/1}$ must be added to the voltage $V_{c3/other}=V_{c3/2}$ across the capacitor C3/2 of the inverter 2. In the loop of FIG. 7 the quantities $V_x$ and $V_{c3/other}$ are disturbance factors and their effect must be controllable.

In some embodiments, the block R(s) can be a simple integrator. Therefore, we will have:

$$\Delta V_{C3/X} = \frac{K_I}{s} * e_I \qquad (3)$$

In this case we will have the following three partial transfer functions:

$$W_1(s) = \frac{I_{leak}}{I_{leak}^*} = \omega_{cc} \frac{1}{s + \omega_{cc}} \qquad (4)$$

$$W_2(s) = \frac{I_{leak}}{Vx} = -\frac{1}{4R} * \frac{1}{s + \omega_{cc}}$$

$$W_3(s) = \frac{I_{leak}}{V_{C3/other}} = -\frac{1}{2R} \frac{s}{s + \omega_{cc}}$$

where $$\omega_{cc} = \frac{K_I}{2R}$$

and $K_1$ is the gain of the integral regulator in question.

The single dominant pole of the closed loop is present in each partial transfer function so that the system is stable and the bandwidth can be selected at will.

Considering a variation in three steps (for the reference leakage current $I_{leak}^*$, for the signal $Vx$ and for the signal $V_{c3/other}$), the temporal response is given by the following equation:

$$R(t) = \left(I_{leak}^* + \frac{Vx}{4T\omega_{cc}}\right) * u_{-1}(t) - \left(\frac{I_{leak}^*}{\omega_{cc}} + \frac{Vx}{4R\omega_{cc}} + \frac{V_{C3/other}}{2R}\right) * e^{-\omega_{cc}t} \quad (5)$$

where t is the time and u_1(t) is a stepped function equal to "0" for t<0 and "1" for t≥0.

The steady state response (with t→+∞) is therefore:

$$\overline{R} = \left(I_{leak}^* + \frac{Vx}{4R\omega_{cc}}\right) \quad (6)$$

Therefore, at steady state the disturbance factor given by $V_{c3/other}$ tends toward zero. The leakage current control loop is stable and independent from the number and from the operating condition of other inverters connected to the same winding of the LV/MV transformer. This means that each machine that adopts the control method described above does not require any form of communication with other electrical machines placed in physical proximity. Moreover, the leakage current tends toward the desired value ($I_{leak}^*=0$ in the example considered).

By selecting the appropriate value of $I_{leak}^*$ complete control of the leakage current is obtained. In particularly advantageous embodiments of the invention, it shall be attempted to eliminate the residual leakage current. Returning to the equation (6) it can be seen that the reference $I_{leak}^*$ for the leakage control loop must have the value:

$$I_{leak}^* = -\frac{Vx}{4R\omega_{cc}} \quad (7)$$

The control loop of the DC/DC stage of each inverter can be designed in any manner known to those skilled in the art. For example, a dual channel booster architecture can be used, the first channel connected to the capacitor C3/x and the second to the capacitor C2/x. The only restriction that must be observed is the correct bandwidth hierarchy. In general, it is advisable that $$\omega_{cc}^{Volt\_DC\_DC} > 10 * \omega_{cc} \quad (8)$$

where $\omega_{cc}^{Volt\_DC-DC}$ the value of the closed cycle pole of the voltage loop of the DC/DC stage and $\omega_{cc}$ is the value of the closed cycle pole of the leakage current balancer according to the invention.

This condition ensures that there is no influence of the voltage control loop of the DC/DC stage on the leakage current control loop.

In the description above reference was made to a multi-level inverter. In the example illustrated the inverters 1 and 2 are four-level inverters. However, the invention can also be applied to inverters with only two voltage levels. In this case, only one pair of capacitors will be provided at the input of each inverter, in particular the capacitors C2/1, C3/1 or C2/2, C3/2, between which there is provided the isolated central ground point T1 or T2. The DC source is connected to the series arrangement of the two capacitors.

Moreover, in the example illustrated, specific reference is made to a system which converts electrical energy coming from two DC sources represented by panels or fields of photovoltaic panels PV1 and PV2 and which supplies the AC energy output from the inverters to a distribution grid GR. Other embodiments can provide for different uses of the energy delivered from the inverters. In some embodiments, the inverters can be connected in parallel to a common load, for example a three-phase electric motor. In other embodiments, the system can be configured to supply a load and, in the case of energy exceeding that absorbed by the load, supply the excess energy to an electrical distribution grid.

Although, as is clear from the description below, use of two leakage current control loops, one for each inverter, allows rapid convergence of the systems toward the steady-state condition, with zero leakage current or more generally equal to the desired value $I_{leak}^*$, in some embodiments one of the two inverters can be without the leakage current control loop. In fact, in the case in which the system comprises only two inverters, the same leakage grounding current $I_{leak}$ circulates through the two inverters. With a control loop that eliminates the leakage current on one inverter the leakage current of the other inverter is eliminated automatically. In other embodiments, with a greater number of inverters in parallel, it is again possible for one of the inverters to be devoid of leakage current control loop. Therefore, in practice, if each inverter is provided with a control loop of the leakage grounding current a redundant system is obtained. Failure of one of the control loops does not prejudice operation of the entire system, in any case allowing the leakage current to be maintained under control and suppressed.

The invention claimed is:

1. An electrical energy conversion system comprising: a first inverter comprising a first inverter input, a first inverter output,
   a first bulk capacitor circuit coupled to the first inverter input; a first inverter ground branch including a first inverter ground connection and a first current sensor effective to provide a first sensor signal proportional to a first leakage current measured in the first inverter ground branch;
   a second inverter comprising a second inverter input,
   a second inverter output connected in parallel to the first inverter output, and
   a second bulk capacitor circuit coupled to the second inverter input; first DC voltage source terminals coupled to the first inverter input; second DC voltage source terminals coupled to the second inverter input; and a first control loop responsive to the first sensor signal and effective to apply a first feedback signal to vary a voltage across the first inverter bulk capacitor circuit.

2. The system of claim 1 further wherein the first control loop is effective to vary the voltage across the first bulk capacitor circuit to reduce a difference between a first measured leakage current and a first desired leakage current reference.

3. The system according to claim 2 further comprising:
   the second inverter further comprising a second inverter ground branch including a second inverter ground connection and a second current sensor effective to supply a second sensor signal proportional to a second leakage current measured in the second inverter ground branch;

a second control loop responsive to the second sensor signal and effective to apply a second feedback signal to vary a voltage across the second bulk capacitor circuit; and the second control loop is effective to vary a voltage across the second bulk capacitor circuit to reduce a difference between a second measured leakage current and a second desired leakage current.

4. The system according to claim 1, wherein the first and second desired leakage currents are equal to zero.

5. The system according to claim 1, wherein the first and second bulk capacitor circuits each comprise at least two bulk capacitors in series at a central ground point, the central ground points of the first and second inverters being at the same potential.

6. The system according to claim 5, wherein each of the first and second DC voltage source terminals comprises respective positive and negative poles coupled across the respective bulk capacitors connected in series.

7. The system according to claim 6, wherein each of the first and second control loops comprise a respective a leakage current control loop associated with a voltage control loop coupled to a respective one of the first and second bulk capacitor circuits.

8. The system according to claim 1, wherein: each of the first and second inverters comprises a multi-level inverter; and each of the first and second bulk capacitor circuits comprises a plurality of bulk capacitors connected in series.

9. The system according to claim 1, wherein each of the first and second inverters comprises a three-phase inverter.

10. The system according to claim 1, wherein each of the first and second inverters comprises a DC/DC stage and a DC/AC stage.

11. The system according to claim 3, wherein each of the first and second inverter ground branches further comprises a respective resistor connected in series with the respective first and second current sensor.

12. The system according to claim 11, wherein each of the first and second inverter ground branches further comprises a respective protection fuse.

13. The system according to claim 1, wherein each of the first and second inverters is connected in parallel to an electrical distribution grid.

14. The system according to claim 1, wherein the first and second DC voltage source terminals are coupled to a renewable energy source.

15. The system according to claim 14, wherein each of the renewable energy sources comprises photovoltaic panels.

16. The system according to claim 15, wherein:
at least one of the first and second inverters further comprises an MPPT control loop coupled to the output of the renewable energy source;
the MPPT control loop is effective to perform an MPPT algorithm; and wherein the voltage variation across the first or second bulk capacitor circuit is responsive to the MPPT control loop.

17. The system according to claim 1, wherein first and second inverter outputs are connected to a same winding of a grid connection transformer.

18. An energy conversion system comprising:
a plurality N of inverters, each of the plurality N of inverters comprising respective inverter outputs connected in parallel; and at least N−1 of the plurality of inverters each comprises a ground connection branch comprising a respective current sensor to supply a signal proportional to a leakage current measured by the current sensor, a bulk capacitor circuit, and a control loop which, on the basis of a signal proportional to the leakage current measured by the respective current sensor and of a desired leakage current reference, imparts a voltage variation across the bulk capacitor circuit of the respective inverter, the voltage variation being effective to reduce a difference between the measured leakage current and the desired leakage current reference.

19. A method comprising:

providing an energy conversion system including at least a first inverter and a second inverter, each of the first and second inverters having an inverter input, a ground connection, a bulk capacitor circuit coupled to the inverter input, and respective inverter outputs connected in parallel, at least a first DC voltage source connected to the first inverter input and a second DC voltage source connected to the second inverter input;

detecting a leakage current in the respective ground connection of at least one of the at least first and second inverters; and generating a feedback signal to control the detected leakage current, the feedback signal being applied to a control loop for controlling the voltage across the bulk capacitor circuit of the respective inverter.

20. The method of claim 19, further comprising:

controlling a voltage across the bulk capacitor circuit of the at least one inverter to impart to the respective leakage current a variation toward a desired leakage current value.

21. The method according to claim 19, wherein the leakage current for each of the inverters is detected, and for each of the inverters a respective feedback signal is generated to control the respective leakage current.

22. The method according to claim 20, wherein for each of the inverters a voltage across the respective bulk capacitor circuit is controlled to impart to the respective leakage current a variation toward the respective desired leakage current value.

23. The method according to claim 19, wherein the desired leakage current value is equal to zero.

* * * * *